Oct. 14, 1969
D. A. VAN SCOY
3,472,280
FLUID DIVERTER
Filed March 13, 1967
3 Sheets-Sheet 3
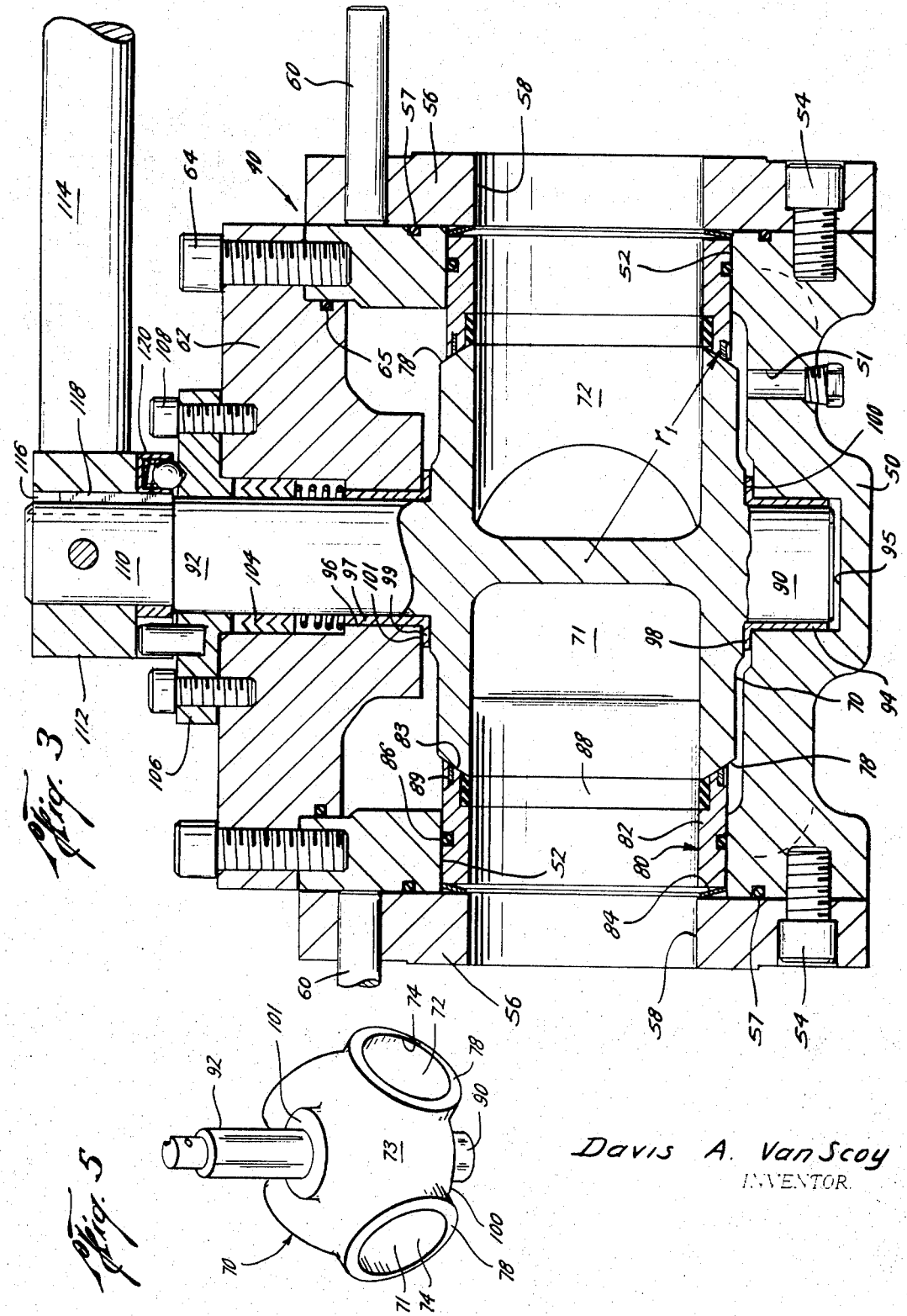
Davis A. Van Scoy
INVENTOR.

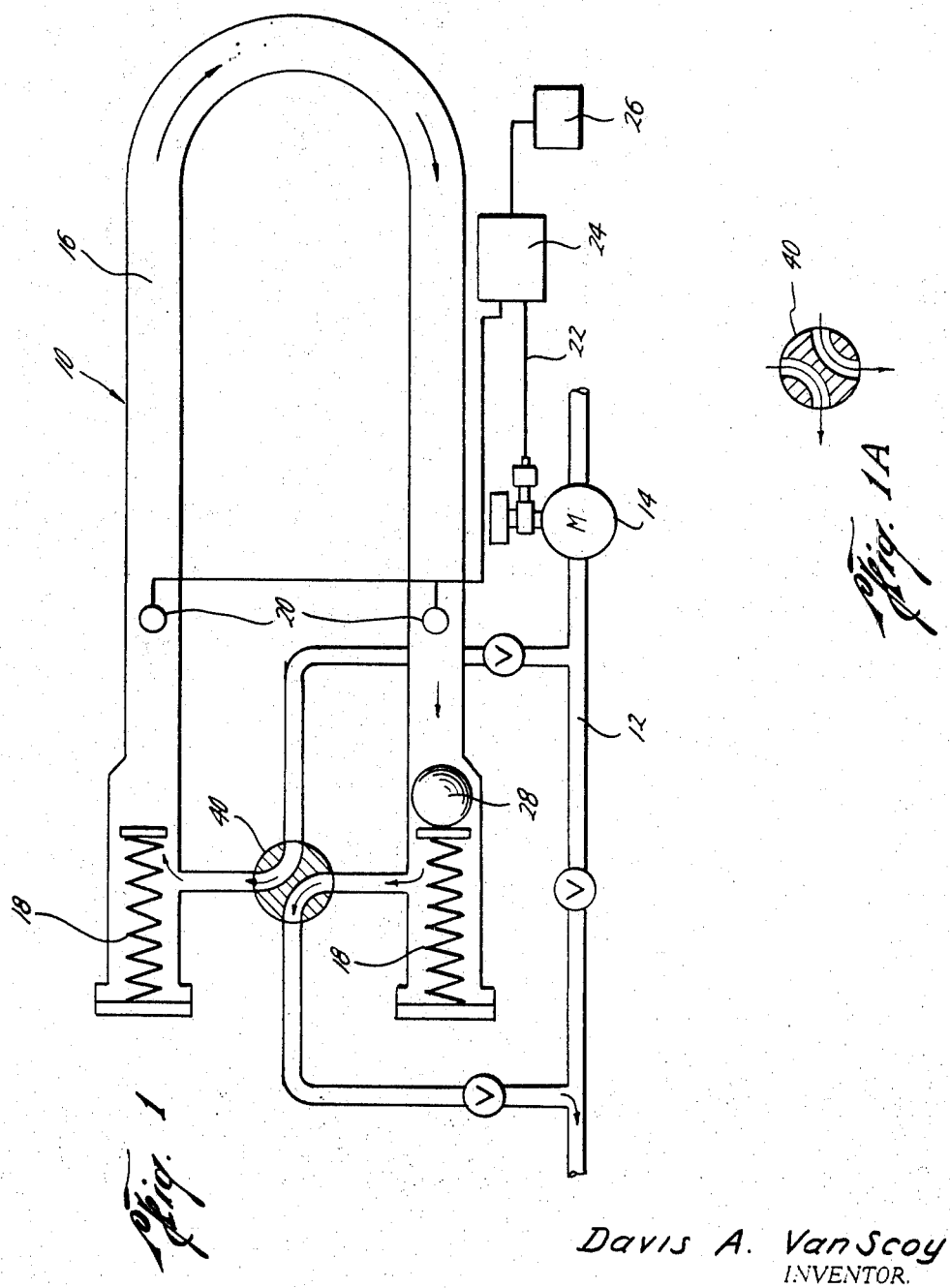

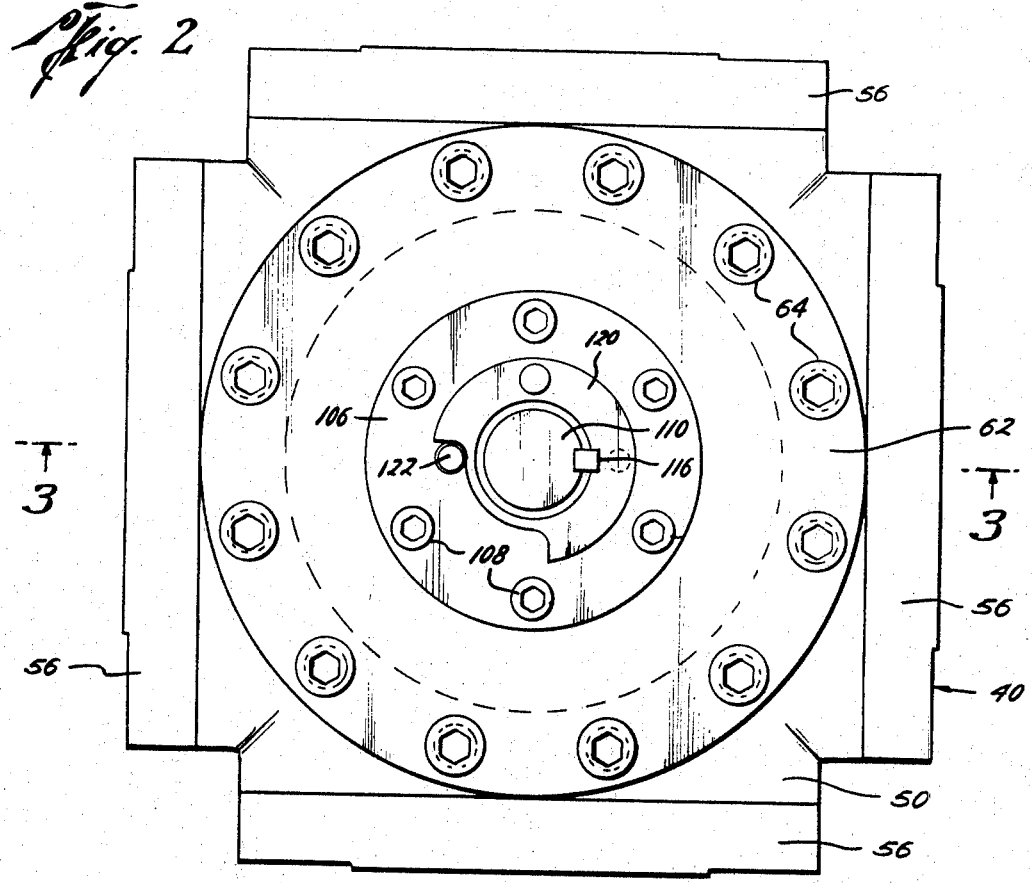
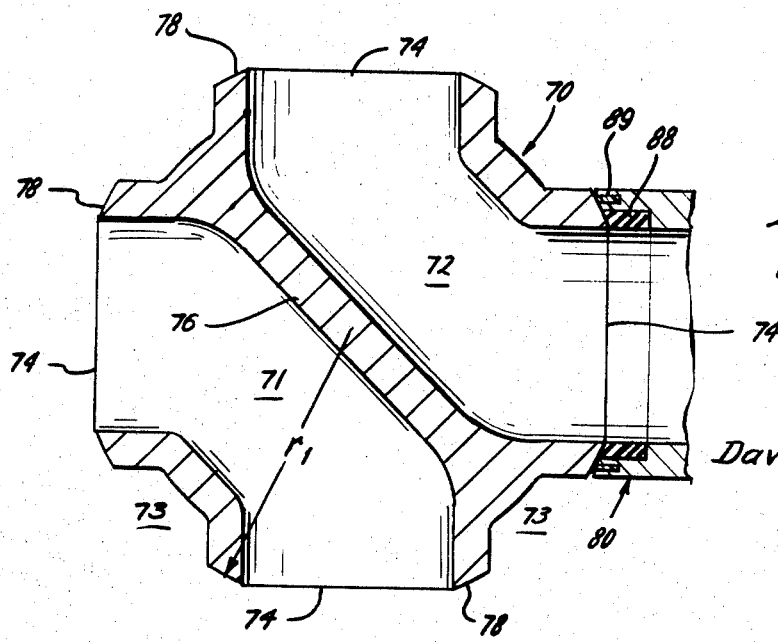

United States Patent Office 3,472,280
Patented Oct. 14, 1969

3,472,280
FLUID DIVERTER
Davis A. Van Scoy, Houston, Tex., assignor to Helmerich & Payne, Inc., Houston, Tex., a corporation of Delaware
Filed Mar. 13, 1967, Ser. No. 622,496
Int. Cl. F16k 11/06; B08b 9/06
U.S. Cl. 137—625.43                        9 Claims

ABSTRACT OF THE DISCLOSURE

A fluid diverter valve having a body with four openings located at 90 degree intervals. The body encloses a rotatable plug which has two passageways therethrough, each passageway having a ninety degree turn. Each passageway allows flow communication between two adjacent body openings. The plug may be rotated ninety degrees to allow flow between two different pairs of body openings. The plug includes spherical surfaces which cooperate with a seal ring in each body opening to seal the passageway when the passageway and body openings are aligned. The plug is also relieved between passageway ports so that the seal is broken if the passageway and opening are slightly out of alignment.

BACKGROUND OF THE INVENTION

Field of the invention

This invention is related to fluid diverting devices. It is more particularly concerned with a diverter valve for use with a bi-directional positive displacement meter prover.

Description of the prior art

Mechanical displacement flowmeter provers are rather recent developments, having come into widespread use only in the last ten or fifteen years. In brief, this method of proving flowmeters involves the propelling of a solid body through a given section of conduit at the velocity of flow of the fluid through the conduit, initiating the registering operation of the flowmeter to be proved which is in series with the conduit, and stopping the registering operation by a signal produced on the arrival of the plug at a predetermined point downstream of the initiating point, thereby accomplishing the calibration or proving of the flowmeter. The meter reading may be compared with the known volume between the initiating and terminating signals. An early patent in this general area in U.S. Patent No. 2,772,561.

Several runs are usually required to make an accurate meter calibration. To eliminate the necessity of removing the plug and manually returning it to the initial point, the uni-directional loop prover was developed. One such prover is described in U.S. Patent No. 3,224,247. In this method a sphere type plug is used. The sphere is propelled around the loop returning to a point above its initial position and caught by a "ball catching" valve. The "ball catching" valve is then rotated allowing the sphere to return to its initial position for another run. Runs are only made in a single direction.

A later development was the bi-directional prover which also utilizes the looped conduit section. However, valving is arranged to reverse the flow in the loop so that runs might be made in both directions in the prover. This method offers several advantages over the uni-directional method. One advantage is that if the switches for initiating and terminating the registering operation drift out of adjustment, this will be compensated for by measurement in the reverse direction. Another advantage is that it can be shorter in length with less potential error in measurement. This is especially important in a portable meter prover.

However, one distinct disadvantage of the bi-directional prover was the necessity to provide equipment to reverse flow directions in the prover. At first this was accomplished by using a valve manifold which included four valves. These valves had to be operated in unison to reverse flow without restricting it. Naturally, the requirement of four valves increased the cost and complexity of such an operation.

At the present time, the trend seems to be toward the use of one four-way diverter valve instead of a four valve manifold. It is required that such a valve be capable of maintaining a perfect seal while proving runs are made and also capable of reversing flow direction in the prover without surging or restricting the flow. One valve which attempts to present a solution is made by the General Valve Company of Long Beach, California. This valve requires lifting, turning, and lowering of a plug in order to divert flow and energize seals located in slips carried by the plug. To divert flow requires rotating the handwheel from one to twenty-five turns depending on the valve size. Another such valve is one made by the M. & J. Valve Company of Houston, Texas and described at page 273 of the 1966–67 Pipeline Catalog. This is a valve with four bottom openings and a rotating cylindrical gate. The gate is divided into two compartments by a partition wall so that flow is maintained between two sets of adjacent bottom openings. The bottom openings contain the sealing elements.

SUMMARY OF THE INVENTION

The diverter valve of the present invention is an efficient, economical valve especially designed for use with bi-directional meter prover systems. It features a body with four openings and a plug with two passageways each entering and leaving the plug at right angles. This allows reversal of flow direction in the meter prover by rotating the valve only one-quarter turn. The plug has spherical surfaces around its passageway ports. A ring seal is resiliently mounted in the body openings so that a positive self-aligning seal is maintained when plug ports and body openings are aligned. This assures accurate meter calibration. The plug is also relieved between parts so that system flow is not restricted during rotation of the plug from one position to another and seal wear is reduced.

BRIEF DESCRIPTION OF THE DRAWINGS

FIGURE 1 is a schematic drawing of a meter proving system employing a fluid diverter according to the invention;

FIG. 1A shows the valve of FIG. 1 rotated one-quarter turn;

FIGURE 2 is a top plan view of one embodiment of the fluid diverter of the invention with its operating handle removed;

FIGURE 3 is an elevation of the diverter of FIGURE 2 partially in section, taken along line 3—3 of FIGURE 2;

FIGURE 4 is a horizontal section of the plug member shown in FIGURE 3 showing its relationship to one of the sealing means; and FIGURE 5 is a perspective view of the plug member shown in FIGURES 3 and 4.

DESCRIPTION OF THE PREFERRED EMBODIMENT

Referring first to FIGURE 1, a schematic representation of a bi-directional meter prover, indicated generally at 10, is shown connected to a pipeline 12 for proving meter 14. The prover includes a looped conduit section 16, two plug catching sections 18, and a four-way diverter valve 40 according to the present invention. Detection switches 20 are attached at two points on the looped section, the loop volume between them being known. The register of meter 14 is attached by a tachometer cable 22 to counter 24. Switches 20 are electrically connected to counter 24 also. Power supply 26 provides necessary electricity. With diverter valve 40 in the position shown, flow is clockwise in looped section 16 as shown by the arrows. Thus, the spherical plug 28 which is originally at upper plug catching section 18 is propelled around the loop to the position shown. In so doing plug 28 first initiates recording of counter 24 by contacting upper switch 20 then terminates recording by contacting the lower switch. The next run will be initiated by rotating diverter valve 40 one-quarter turn to a position as shown in FIGURE 1A. This reverses flow in looped section 16 causing plug 28 to be propelled in a counter-clockwise direction.

It is extremely important that diverter valve 40 be perfectly sealed during calibration runs. It is also important for accurate measurements that flow through meter 14 be uninterrupted when meter prover flow is being reversed. This requires a specially designed diverter valve, such as the present invention.

Referring now to FIGURES 2 and 3, valve 40 will be described in detail. Valve 40 has a hollow body 50 with four horizontal flow openings 52 at ninety degree intervals around its periphery. Surrounding each opening and attached to body 50 with a plurality of machine bolts 54 are removable flanges 56 whose openings 58 are of a smaller diameter than body openings 52 and concentric therewith. Flanges 56 are sealed against body 50 by O-rings 57. Means, such as a plurality of stud bolts 60, are provided to connect fluid conduits (not shown) to each flange 56. A circular valve bonnet 62 is attached to the upper portion of body 50 by a plurality of machine bolts 64 and sealed by O-ring 65. A block and bleed port 51 is provided in body 50 to check seals to be later explained.

Enclosed within the cavity of body 50 and bonnet 62 is a rotatable diverter plug 70 which can best be understood with reference to FIGURES 3, 4, and 5. Plug 70 is provided with two horizontal ninety degree turn passageways 71 and 72 terminating in four ports 74 at alternate ninety degree intervals. When plug 70 is properly positioned each port 74 will be concentrically aligned with body and flange openings 52 and 58. A partition wall 76 provides internal separation of passageways 71 and 72. Each sealing surface 78 around each port 74 lies in the surface of a sphere with the radius $r_1$.

A sealing arrangement noted at 80 is generally confined in each body opening 52. Sealing means 80 may be any one of several configurations. The one shown in this particular embodiment has a generally cylindrical carrier portion 82 which is resiliently urged toward plug 70 by spring means 84, and sealed against body 50 by O-rings 86. It may be made of any suitable material, i.e. bronze. The inner face 83 of carrier 82 is an outwardly converging frusto-conical surface. Carrier 82 is machined at its inner face and interior to receive an annular rubber ring sealing element 88 whose inner face may also be frusto-conical. An annular groove in the inner face of carrier 82 may be provided to receive an annular wiping member 89 made of nylon or similar materials. Sealing means 80 may be replaced or repaired by simply removing flange 56. As has been stated, other sealing arrangements, such as the one disclosed in U.S. Patent No. 3,109,623, may also be used.

Plug 70 is provided with lower cylindrical extension 90 and upwardly extending cylindrical stem 92. Extension 90 rides within bushing 94 positioned in a lower cylindrical cavity 95 of body 50. Stem 92 projects upwardly through a central opening 96 in bonnet 62 and is surrounded by a bushing 97. Bushings 94 and 97 have flanged portions 98 and 99 which bear against flat annular bearing surfaces 100 and 101 surrounding extension 90 and stem 92 respectively.

An important feature of plug 70 is the fact that it is relieved at 73 around spherical sealing surfaces 78 so that these surfaces 78 and ports 74 project outwardly similar to a piping "cross." The purpose of this relief will be subsequently explained.

Referring again to FIGURES 2 and 3, annular stem packing 104 and packing spring 105 surround stem 92 within bonnet 62. A packing retainer ring 106 is attached to bonnet 62 by a plurality of machine bolts 108. The upper part of stem 92 has a smaller diameter portion 110 to receive a surrounding hub portion 112 of operating handle 114. Rectangular slots 116 may be vertically and cooperatively machined in hub 112 and stem portion 110 to receive a key 118 for affixing handle 114 to stem 92. A pin locking arrangement may also be provided to engage hole 120 through stem portion 110. Of course, other means may be used to rotate plug 70, i.e., automatic operators. A ninety degree stop arrangement may be provided including stop ring 120 and stop pin 122. Stop ring 120 has a ninety degree segment machined out of its circumference to allow pin 122 to ride therein but to prevent rotation of ring 120 when pin 122 abuts either end of the segment. Stop ring 120 is also keyed to portion 110 of stem 92.

The operation of diverter valve 40 will now be summarized. Assuming valve 40 is in the positions shown in FIGURE 1 and FIGURE 4 both passageways 71 and 72 are well sealed by sealing arrangement 80 located at each body opening. Since the sealing surfaces 78 of each plug port 74 are spherical and annular sealing element 88 is urged toward these surfaces an efficient self aligning seal is attained. Thus, accurate meter calibration runs may be made. When reversal of meter prover flow is required plug 70 is rotated one-quarter turn. On slight rotation the seal is broken since plug 70 is relieved at 73. Thus, fluid may flow through and around the plug so that there is no appreciable reduction of flow through the meter and meter prover system. Thus, operations are not curtailed and more accurate readings may be obtained from the system free of surging. When plug 70 approaches the final part of its one-quarter turn the seals are once again engaged by its spherical sealing surfaces 78 and once again a perfect seal is attained with flow now in the reverse direaction in the meter prover as indicated in FIGURE 1A.

I claim:

1. A fluid diverting valve for use at a pipe injunction, said valve comprising a body housing having at least three flow openings and a non-reciprocating rotatable plug and stem within said housing, said plug having at least one passageway therethrough fixed relative to said plug and stem at all times, said passageway being alignable with at least one adjacent pair of said body flow openings and on less than a complete revolution of said plug and stem being alignable with another adjacent pair of said flow openings, wherein the improvement comprises an annular sealing means in each flow opening and a sealing surface around the ports of said passageways resiliently urged against each other to maintain a fluid tight seal only when said ports and said body openings are substantially aligned, said plug being relieved all around said port sealing surfaces so that throughout complete rotation of said plug there is substantially no reduction of fluid flow through said valve.

2. The combination of claim 1 in which said sealing surfaces around said ports are spherical surfaces so that when said ports and said body openings are lightly out of alignment with each other fluid flow is allowed in all directions around said plug.

3. The combination of claim 1 in which said sealing means is removable from said body openings without removing said plug from said valve body.

4. A fluid diverting valve for use with a bi-directional meter prover system, said valve comprising a body with four openings at ninety degree intervals around said body, a valve bonnet, and rotatable plug means enclosed within said body and said valve bonnet, said plug means having two ninety degree turn passageways therethrough, the walls of which are an integral part of said plug means, so that when said plug is properly positioned flow communication is established between two sets of adjacent body openings through said passageways and on one-quarter rotation of said plug flow communication between two other sets of adjacent body openings is established, wherein the improvement comprises sealing means for sealing flow through said passageways and said adjacent body openings when the ports of said passageways and said body openings are concentrically aligned, said ports being surrounded by annular sealing surfaces, the outer surface of said plug being relieved around said ports to prevent substantial reduction of flow through said valve through complete rotation.

5. The combination of claim 4 in which said sealing means comprises a cylindrical carrier within said body openings resiliently urged toward said plug means and an annular resilient sealing element carried between the inner face of said carrier and sealing surfaces around said plug ports, said sealing surfaces lying in the surface of a sphere.

6. The combination of claim 5 in which said sealing means is removable from said body openings without removing said plug or said valve bonnet.

7. A fluid diverter compirsing a body with a plurality of flow openings, a bonnet, a non-reciprocating rotatable plug means within said body, said plug means having at least two passageways therethrough so that when said plug is properly positioned flow communication is established between a pair of said flow openings through one of said passageways and on less than one revolution of said plug communication is established between another pair of said flow openings through one of said passageways, means for rotating said plug means, and sealing means for sealing said passageways from said body cavity when said passageway ports and said flow openings are concentrically aligned, wherein the improvement comprises a sealing surface around said ports, said sealing surface lying in the surface of a sphere, said plug means being relieved around said sealing surfaces so that on rotation only of said plug and disalignment of said ports and said openings flow is allowed around said plug means to prevent substantial reduction of fluid flow through said fluid diverter.

8. The combination of claim 7 in which said sealing means comprises a cylindrical carrier surrounded by said body opening and sealed therebetween and an annular resilient sealing element on the inner face of said carrier in contact with said sealing surface around said ports.

9. The combination of claim 7 in which said means for rotating said plug means includes a stem fixedly attached to said plug and non-movable relative to said passageways, said stem being rotatable externally of said body cavity to cause said plug to rotate.

References Cited

UNITED STATES PATENTS

| 3,295,357 | 1/1967 | Halpine et al. | 73—3 |
| 3,362,433 | 1/1968 | Heinen | 137—625.43 |

FOREIGN PATENTS

| 963,792 | 7/1964 | Great Britain. |
| 1,378,996 | 10/1964 | France. |

ROBERT W. MICHELL, Primary Examiner

U.S. Cl. X.R.

15—104.06; 251—174

PO-1050
(5/69)

UNITED STATES PATENT OFFICE
CERTIFICATE OF CORRECTION

Patent No. 3,472,280          Dated October 14, 1969

Inventor(s) Davis A. Van Scoy

It is certified that error appears in the above-identified patent and that said Letters Patent are hereby corrected as shown below:

Claim 1, line 46: change "injunction" to -- junction --.

Claim 2, line 66: change "lightly" to -- slightly --.

SIGNED AND
SEALED
FEB 17 1970

(SEAL)
Attest:

Edward M. Fletcher, Jr.
Attesting Officer

WILLIAM E. SCHUYLER, JR.
Commissioner of Patents